(12) United States Patent
Miao et al.

(10) Patent No.: US 12,133,215 B2
(45) Date of Patent: Oct. 29, 2024

(54) TRANSMISSION METHOD AND TERMINAL

(71) Applicant: DATANG MOBILE COMMUNICATIONS EQUIPMENT CO., LTD., Beijing (CN)

(72) Inventors: Jinhua Miao, Beijing (CN); Pierre Bertrand, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 611 days.

(21) Appl. No.: 17/299,076

(22) PCT Filed: Aug. 16, 2019

(86) PCT No.: PCT/CN2019/100960
§ 371 (c)(1),
(2) Date: Jun. 2, 2021

(87) PCT Pub. No.: WO2020/113997
PCT Pub. Date: Jun. 11, 2020

(65) Prior Publication Data
US 2022/0061070 A1 Feb. 24, 2022

(30) Foreign Application Priority Data

Dec. 6, 2018 (CN) .......................... 201811486761.7
Jan. 17, 2019 (CN) .......................... 201910043921.9

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 27/26025* (2021.01); *H04W 72/20* (2023.01); *H04W 72/542* (2023.01)

(58) Field of Classification Search
CPC ... H04L 1/0018; H04L 1/1812; H04L 5/0044; H04L 5/0053; H04L 27/26025;
(Continued)

(56) References Cited

U.S. PATENT DOCUMENTS 10,218,558 B2 * 2/2019 Dinan ................. H04L 27/0006
10,448,423 B2 * 10/2019 Babaei ................. H04W 72/23
(Continued)

FOREIGN PATENT DOCUMENTS

AU 2017336823 A1 * 2/2019 ............. H04L 27/26
AU 2017336823 B2 * 3/2022 ............. H04L 27/26
(Continued)

OTHER PUBLICATIONS

Chinese Office Action dated Jan. 27, 2022 for Chinese Application No. 2010910043921.9.
(Continued)

*Primary Examiner* — Eric Nowlin
(74) *Attorney, Agent, or Firm* — Harness, Dickey & Pierce, P.L.C.

(57) ABSTRACT

The present disclosure provides a transmission method and a terminal. The transmission method includes: in a case that a first transmission resource overlaps with a second transmission resource, determining a logical channel with higher latency requirement from a first logical channel and a second logical channel; and instructing a physical layer to transmit data on a transmission resource corresponding to the determined logical channel. The first logical channel is corresponding to the first transmission resource, and the second logical channel is corresponding to the second transmission resource.

18 Claims, 3 Drawing Sheets

(51) Int. Cl.
  *H04L 27/26* (2006.01)
  *H04W 72/20* (2023.01)
  *H04W 72/542* (2023.01)
(58) Field of Classification Search
  CPC ......... H04W 72/0453; H04W 72/1268; H04W 72/20; H04W 72/21; H04W 72/23; H04W 72/53; H04W 72/542; H04W 72/56; H04W 72/563; H04W 72/569
  See application file for complete search history.

(56) References Cited

U.S. PATENT DOCUMENTS

| | | | | |
|---|---|---|---|---|
| 10,485,017 | B2* | 11/2019 | Ye | H04W 72/23 |
| 10,524,294 | B2* | 12/2019 | Babaei | H04L 5/0094 |
| 10,638,455 | B2* | 4/2020 | Agiwal | H04W 72/23 |
| 10,674,528 | B2* | 6/2020 | Kunt | H04W 72/23 |
| 10,687,248 | B2* | 6/2020 | Babaei | H04W 72/21 |
| 10,736,116 | B2* | 8/2020 | Park | H04L 5/0064 |
| 10,750,526 | B2* | 8/2020 | Wu | H04W 74/0833 |
| 10,791,202 | B2* | 9/2020 | Okubo | H04L 69/16 |
| 10,841,830 | B2* | 11/2020 | Babaei | H04W 74/006 |
| 11,071,129 | B2* | 7/2021 | Jiang | H04W 72/23 |
| 11,096,194 | B2* | 8/2021 | Tang | H04L 1/1642 |
| 11,122,591 | B2* | 9/2021 | Yang | H04L 1/0016 |
| 11,265,901 | B2* | 3/2022 | Freda | H04W 72/23 |
| 11,425,752 | B2* | 8/2022 | Adjakple | H04W 72/23 |
| 11,490,399 | B2* | 11/2022 | Xu | H04W 72/20 |
| 11,589,257 | B2* | 2/2023 | Lee | H04W 72/02 |
| 11,647,534 | B2* | 5/2023 | Yang | H04W 72/569 370/330 |
| 11,665,556 | B2* | 5/2023 | Wei | H04L 5/0046 370/328 |
| 2017/0127433 | A1 | 5/2017 | Lin | |
| 2017/0295559 | A1* | 10/2017 | Agiwal | H04W 72/23 |
| 2017/0310531 | A1* | 10/2017 | Dinan | H04W 16/14 |
| 2018/0014255 | A1 | 1/2018 | Pelletier et al. | |
| 2018/0132229 | A1 | 5/2018 | Li | |
| 2018/0152939 | A1* | 5/2018 | Lee | H04L 1/1812 |
| 2018/0176937 | A1* | 6/2018 | Chen | H04W 72/21 |
| 2018/0279358 | A1* | 9/2018 | Babaei | H04W 72/0453 |
| 2018/0324635 | A1* | 11/2018 | Babaei | H04W 72/23 |
| 2018/0324872 | A1* | 11/2018 | Babaei | H04W 72/23 |
| 2018/0352567 | A1* | 12/2018 | Ye | H04W 72/21 |
| 2018/0368133 | A1* | 12/2018 | Park | H04L 5/0064 |
| 2018/0368159 | A1* | 12/2018 | Wu | H04W 72/21 |
| 2018/0368160 | A1* | 12/2018 | Kunt | H04W 72/23 |
| 2019/0053251 | A1* | 2/2019 | Loehr | H04W 72/1263 |
| 2019/0098533 | A1* | 3/2019 | Babaei | H04L 1/08 |
| 2019/0342902 | A1* | 11/2019 | Wu | H04L 5/0082 |
| 2019/0364586 | A1 | 11/2019 | Li et al. | |
| 2020/0068600 | A1 | 2/2020 | Yu et al. | |
| 2020/0112391 | A1* | 4/2020 | Yang | H04L 5/0053 |
| 2020/0137775 | A1* | 4/2020 | Tang | H04W 72/23 |
| 2020/0252945 | A1* | 8/2020 | Jiang | H04W 72/0446 |
| 2020/0267594 | A1* | 8/2020 | Xu | H04W 28/0278 |
| 2020/0281012 | A1* | 9/2020 | Behravan | H04W 72/1268 |
| 2020/0296749 | A1* | 9/2020 | Freda | H04W 72/20 |
| 2020/0305186 | A1* | 9/2020 | Alfarhan | H04W 72/0453 |
| 2020/0314869 | A1* | 10/2020 | Xu | H04W 72/23 |
| 2021/0058820 | A1* | 2/2021 | Lee | H04W 28/0268 |
| 2021/0314972 | A1* | 10/2021 | Yang | H04L 5/0053 |
| 2022/0150934 | A1* | 5/2022 | Freda | H04W 28/0268 |
| 2023/0189329 | A1* | 6/2023 | Yang | H04W 72/23 370/330 |

FOREIGN PATENT DOCUMENTS

| | | | | |
|---|---|---|---|---|
| CN | 102932932 | A | | 2/2013 |
| CN | 103580816 | A | | 2/2014 |
| CN | 108293242 | A | | 7/2018 |
| CN | 108811099 | A | | 11/2018 |
| CN | 109565494 | A | * 4/2019 | ............ H04L 27/26 |
| CN | 112789931 | A | * 5/2021 | .......... H04L 1/0013 |
| CN | 110547013 | B | * 4/2024 | .......... H04L 1/1642 |
| EP | 3301986 | A1 | * 4/2018 | ............ H04L 27/26 |
| EP | 3609256 | B1 | * 12/2021 | .......... H04L 1/1642 |
| EP | 3955683 | A1 | * 2/2022 | ............ H04W 72/23 |
| EP | 3622764 | B1 | * 5/2022 | ............... H04L 5/00 |
| JP | 6967070 | B2 | * 11/2021 | ............ H04L 27/26 |
| KR | 20190060756 | A | * 6/2019 | |
| KR | 20190139919 | A | * 12/2019 | |
| KR | 102409010 | B1 | * 6/2022 | |
| RU | 2734646 | C1 | * 10/2020 | ............ H04L 27/26 |
| SG | 11202102161 | | * 4/2021 | |
| TW | 202025824 | A | * 7/2020 | .......... H04L 1/0013 |
| WO | WO-2018061438 | A1 | * 4/2018 | ............ H04L 27/26 |
| WO | WO-2018/133398 | A1 | 7/2018 | |
| WO | WO-2018195775 | A1 | * 11/2018 | .......... H04L 1/1642 |
| WO | WO-2018231020 | A1 | * 12/2018 | ............... H04L 5/00 |
| WO | WO-2020076840 | A1 | * 4/2020 | .......... H04L 1/0013 |

OTHER PUBLICATIONS

Vivo, "Discussion on handling UL multiplexing of transmissions with different reliability requirements", Agenda item 7.2.4, 3GPP TSG RAN WG1 Meeting #92, R1-1801550, Feb. 26-Mar. 2, 2018, Athens, Greece.
Huawei, Hisilicon, "LCP with Multiple Numerologies", Agenda item 10.2.1.2, 3GPP TSG-RAN WG2 #97, R2-1701203 (revision of R2-1700085) Feb. 13-17, 2017, Athens, Greece.
Qualcomm Inc, Huawei, Hisilicon, Interdigital, "New MCS table and LCP restrictions", Agenda item 10.3.1.7, WID/SID: NR_newRAT-Core—Release 15, 3GPP TSG-RAN WG2 Meeting #AH NR 1802, R2-1810426, Jul. 2-6, 2018, Montreal, Canada.
Catt, "Intra-UE Prioritization and Multiplexing for IIoT", Agenda item 11.7.3, 3GPP TSG-RAN WG2 Meeting 104, R2-1816364, Nov. 12-16, 2018, Spokane, U.S.A.
Vivo, "Interaction between MAC and PHY for intra-UE prioritization", Agenda item 11.7.3, 3GPP TSG-RAN WG2 Meeting #104, R2-1816942, Nov. 12-16, 2018, Spokane, USA.
Extended European Search Report dated Jan. 4, 2022 for Application No. EP 19893974.6.
3GPP TS 28.331 V15.3.0 (Sep. 2018), 3rd Generation Partnership Project, Technical Specification Group Radio Access Network; NR; Radio Resource Control (RRC) protocol specification (Release 15).
Interdigital, "Scheduling aspects of UL intra-UE prioritization", Agenda item 11.7.3, 3GPP TSG-RAN WG2 Meeting #104, R2-1816778, Nov. 12-16, 2018, Spokane, U.S.A.
Ericsson, "On prioritization between overlapping configured and dynamic grants", Agenda item 11.7.3, 3GPP TSG-RAN WG2 #1044, Tdoc R2-1817178, Nov. 12-16, 2018, Spokane, USA.
Catt, "Multiplexing of UL transmissions of different reliability requirements", Agenda Item 7.2.4, 3GPP TSG RAN WG1 Meeting #92bis, R1-1803768, Sanya, China, Apr. 16-20, 2018.
Catt, "Discussion on LCID as primary path", 3GPP TSG-RAN WG2 #104, R2-1816277, Spokane, USA, Nov. 12-16, 2018.
Written_Opinion_and_International Search Reported dated Nov. 25, 2019 for International Application No. PCT/CN2019/100960.
Office Action dated Aug. 22, 2023 issued in related Korean patent application No. 10-2021-7018380.
"Discussion on the relative priority order of NR LCP," R2-1712215, 3GPP TSG-RAN WG2 Meeting #100, Reno, USA, Nov. 27-Dec. 1, 2017, Source: ASUSTeK.
Communication pursuant to article 94(3) EPC issued Mar. 14, 2024 in European Application No. 19893974.6.
HiSilicon Huawei, "SR procedure in NR," 3GPP TSG-RAN2 Meeting #99bis, R2-1710109, Sep. 28, 2017.

* cited by examiner

TRANSMISSION METHOD AND TERMINAL

CROSS-REFERENCE TO RELATED APPLICATIONS

This application is the U.S. national phase of PCT Application No. PCT/CN2019/100960 filed on Aug. 16, 2019, which claims priority to Chinese Application No. 201811486761.7, filed Dec. 6, 2018, and the priority of Chinese Application No. 201910043921.9, filed on Jan. 17, 2019, each of which are incorporated herein by reference in their entireties.

TECHNICAL FIELD

The present disclosure relates to the technical field of communication applications, and in particular to a transmission method and a terminal.

BACKGROUND

In the related art, in a case that an uplink scheduling request (SR) or a hybrid automatic repeat request (HARQ) feedback collides with a physical uplink shared channel (PUSCH) transmission, or, in a case that two PUSCH transmissions collide, such as overlapping in time, a user equipment (UE) will choose to transmit PUSCH first, or multiplex HARQ feedback or CSI onto a PUSCH channel, stop physical uplink control channel (PUCCH) transmission and then transmit a triggered SR on a next available SR resource, or discard HARQ feedback information. However, this will cause transmission delay of an SR of an emergency service or an increase of HARQ feedback delay; for example, this will cause transmission delay of an SR in a case that the SR is configured for an emergency service such as an SR configured for an ultra-reliable and low latency communications (URLLC) service, which affects the network side scheduling a buffer status report (BSR), thereby affecting latency of services with higher latency requirement.

For another example, an URLLC service is configured with a transmission mode of configured-grant-type 1, and an enhanced mobile broadband (eMBB) service is configured to be transmitted in a dynamic grant mode. The URLLC service has higher latency requirement, and the eMBB service has lower latency requirement. However, practices in the related art are that in a case that a configuration-granted resource collides or overlaps with a dynamically granted resource, the UE will perform transmission over the dynamically granted resource, which causes greater delay of services with higher latency requirement.

According to the foregoing description, in a case of resource overlapping, the transmission scheme in the related art will affect the transmission delay of services with higher latency requirement, thereby affecting performance of the services.

SUMMARY

A purpose of the present disclosure is to provide a transmission method and a terminal, which can solve the problem that in a case of resource overlapping, the transmission scheme in the related art will affect the transmission latency of services with higher latency requirement.

In order to achieve the foregoing purpose, one embodiment of the present disclosure provides a transmission method performed by a terminal, including: in a case that a first transmission resource overlaps with a second transmission resource, determining a logical channel with higher latency requirement from a first logical channel and a second logical channel; and instructing a physical layer to transmit data on a transmission resource corresponding to the determined logical channel; wherein the first logical channel is corresponding to the first transmission resource, and the second logical channel is corresponding to the second transmission resource.

Optionally, the first transmission resource is a transmission resource of control information, and the second transmission resource is an uplink shared channel resource; or, the first transmission resource and the second transmission resource are both uplink shared channel resources.

Optionally, the control information includes at least one kind of the following: scheduling request (SR), hybrid automatic repeat request (HARQ) feedback information, or channel state information (CSI).

Optionally, the determining the logical channel with higher latency requirement from the first logical channel and the second logical channel, includes: acquiring configuration information of logical channels, wherein the logical channels include the first logical channel and the second logical channel; according to the configuration information of the logical channels, determining the logical channel with higher latency requirement from the first logical channel and the second logical channel.

Optionally, the configuration information is configured to indicate transmission latency of the logical channels.

Optionally, the configuration information includes at least one of the following: duration information of a maximum physical uplink shared channel (PUSCH), subcarrier spacing (SCS) list information, modulation and coding scheme (MCS) list information, priority information or configuration grant information.

Optionally, in a case that the configuration information includes the duration information of the maximum physical uplink shared channel (PUSCH), the determining the logical channel with higher latency requirement from the first logical channel and the second logical channel, includes: in a case that a duration of a first PUSCH is less than or equal to a duration of a second PUSCH, determining the first logical channel as a logical channel with higher latency requirement; otherwise, determining the second logical channel as a logical channel with higher latency requirement; wherein the duration of the first PUSCH is a duration of a maximum PUSCH configured on the first logical channel; and the duration of the second PUSCH is a duration of a maximum PUSCH configured on the second logical channel.

Optionally, in a case that the configuration information includes subcarrier spacing (SCS) list information, the determining the logical channel with higher latency requirement from the first logical channel and the second logical channel, includes: in a case that a first SCS is greater than or equal to a second SCS, determining the first logical channel as a logical channel with higher latency requirement; otherwise, determining the second logical channel as a logical channel with higher latency requirement; wherein the first SCS is a maximum SCS configured on the first logical channel, and the second SCS is a maximum SCS configured on the second logical channel.

Optionally, a case that the configuration information includes configuration grant information, the determining the logical channel with higher latency requirement from the first logical channel and the second logical channel, includes: in a case that first configuration grant information includes allowing to use configured-grant-type 1 and second configuration grant information includes not allowing to use configured-grant-type 1, determining the first logical channel as a logical channel with higher latency requirement; in a case that the first configuration grant information includes not allowing to use configured-grant-type 1 and the second configuration grant information includes allowing to use configured-grant-type 1, determining the second logical channel as a logical channel with higher latency requirement; wherein the first configuration grant information is configuration grant information of the first logical channel, and the second configuration grant information is configuration grant information of the second logical channel.

Optionally, in a case that the configuration information includes priority information, the determining the logical channel with higher latency requirement from the first logical channel and the second logical channel, includes; in a case that a first priority is higher than or equal to a second priority, determining the first logical channel as a logical channel with higher latency requirement; otherwise, determining the second logical channel as a logical channel with higher latency requirement; wherein the first priority is a priority configured for the first logical channel, and the second priority is a priority configured for the second logical channel.

Optionally, in a case that the configuration information includes duration information of a maximum physical uplink shared channel (PUSCH), subcarrier spacing (SCS) list information, modulation and coding scheme (MCS) list information and configuration grant information, the determining the logical channel with higher latency requirement from the first logical channel and the second logical channel, includes: judging whether the configuration information meets a preset condition: in a case that the configuration information meets the preset condition, determining the first logical channel as a logical channel with higher latency requirement; otherwise, determining the second logical channel as a logical channel with higher latency requirement. The preset condition includes at least one of the following: a duration of a first PUSCH is less than or equal to a duration of a second PUSCH; a first SCS is greater than or equal to a second SCS; first configuration grant information includes allowing to use configured-grant-type 1 and second configuration grant information includes not allowing to use configured-grant-type 1; first MCS information includes supporting a preset modulation method, or second MCS information includes not supporting a preset modulation method. The duration of the first PUSCH is a duration of a maximum PUSCH configured on the first logical channel; and the duration of the second PUSCH is a duration of a maximum PUSCH configured on the second logical channel. The first SCS is a maximum SCS configured on the first logical channel, and the second SCS is a maximum SCS configured on the second logical channel. The first configuration grant information is configuration grant information of the first logical channel, and the second configuration grant information is configuration grant information of the second logical channel. The first MCS information is MCS information supported by the first logical channel, and the second MCS information is MCS information supported by the second logical channel.

Optionally, in a case that the first transmission resource is a transmission resource of an SR, the first logical channel is a logical channel corresponding to a scheduling request configuration of the SR, or a logical channel that triggers the SR; in a case that the first transmission resource is an uplink shared channel resource, the first logical channel is a logical channel for acquiring data transmitted on the uplink shared channel resource.

In order to achieve the foregoing purpose, one embodiment of the present disclosure provides a terminal, including: a transceiver, a memory, a processor, and a program stored in the memory and executable on the processor; wherein the processor executes the program to implement the following steps: in a case that a first transmission resource overlaps with a second transmission resource, determining a logical channel with higher latency requirement from a first logical channel and a second logical channel; and instructing a physical layer to transmit data on a transmission resource corresponding to the determined logical channel. The first logical channel is corresponding to the first transmission resource, and the second logical channel is corresponding to the second transmission resource.

Optionally, the first transmission resource is a transmission resource of control information, and the second transmission resource is an uplink shared channel resource, or, the first transmission resource and the second transmission resource are both uplink shared channel resources.

Optionally, the control information includes at least one kind of the following: scheduling request (SR), hybrid automatic repeat request (HARQ) feedback information, or channel state information (CSI).

Optionally, the processor executes the program to implement the following steps: acquiring configuration information of logical channels, wherein the logical channels include the first logical channel and the second logical channel; according to the configuration information of the logical channels, determining the logical channel with higher latency requirement from the first logical channel and the second logical channel.

Optionally, the configuration information is configured to indicate transmission latency of the logical channels.

Optionally, the configuration information includes at least one of the following: duration information of a maximum physical uplink shared channel (PUSCH), subcarrier spacing (SCS) list information, modulation and coding scheme (MCS) list information, priority information or configuration grant information.

Optionally, in a case that the configuration information includes the duration information of the maximum physical uplink shared channel (PUSCH), the processor executes the program to implement the following steps: in a case that a duration of a first PUSCH is less than or equal to a duration of a second PUSCH, determining the first logical channel as a logical channel with higher latency requirement; otherwise, determining the second logical channel as a logical channel with higher latency requirement; wherein the duration of the first PUSCH is a duration of a maximum PUSCH configured on the first logical channel; and the duration of the second PUSCH is a duration of a maximum PUSCH configured on the second logical channel.

Optionally, in a case that the configuration information includes subcarrier spacing (SCS) list information, the processor executes the program to implement the following steps: in a case that a first SCS is greater than or equal to a second SCS, determining the first logical channel as a logical channel with higher latency requirement; otherwise, determining the second logical channel as a logical channel with higher latency requirement; wherein the first SCS is a maximum SCS configured on the first logical channel, and the second SCS is a maximum SCS configured on the second logical channel.

Optionally, in a case that the configuration information includes configuration grant information, the processor executes the program to implement the following steps: in a case that first configuration grant information includes allowing to use configured-grant-type 1 and second configuration grant information includes not allowing to use configured-grant-type 1, determining the first logical channel as a logical channel with higher latency requirement; in a case that the first configuration grant information includes not allowing to use configured-grant-type 1 and the second configuration grant information includes allowing to use configured-grant-type 1, determining the second logical channel as a logical channel with higher latency requirement; wherein the first configuration grant information is configuration grant information of the first logical channel, and the second configuration grant information is configuration grant information of the second logical channel.

Optionally, in a case that the configuration information includes priority information, the processor executes the program to implement the following steps: in a case that a first priority is higher than or equal to a second priority, determining the first logical channel as a logical channel with higher latency requirement; otherwise, determining the second logical channel as a logical channel with higher latency requirement; wherein the first priority is a priority configured for the first logical channel, and the second priority is a priority configured for the second logical channel.

Optionally, in a case that the configuration information includes duration information of a maximum physical uplink shared channel (PUSCH), subcarrier spacing (SCS) list information, modulation and coding scheme (MCS) list information and configuration grant information, the processor executes the program to implement the following steps: judging whether the configuration information meets a preset condition; in a case that the configuration information meets the preset condition, determining the first logical channel as a logical channel with higher latency requirement; otherwise, determining the second logical channel as a logical channel with higher latency requirement. The preset condition includes at least one of the following: a duration of a first PUSCH is less than or equal to a duration of a second PUSCH; a first SCS is greater than or equal to a second SCS; first configuration grant information includes allowing to use configured-grant-type 1 and second configuration grant information includes not allowing to use configured-grant-type 1; first MCS information includes supporting a preset modulation method, or second MCS information includes not supporting a preset modulation method. The duration of the first PUSCH is a duration of a maximum PUSCH configured on the first logical channel; and the duration of the second PUSCH is a duration of a maximum PUSCH configured on the second logical channel. The first SCS is a maximum SCS configured on the first logical channel, and the second SCS is a maximum SCS configured on the second logical channel. The first configuration grant information is configuration grant information of the first logical channel, and the second configuration grant information is configuration grant information of the second logical channel. The first MCS information is MCS information supported by the first logical channel, and the second MCS information is MCS information supported by the second logical channel.

Optionally, in a case that the first transmission resource is a transmission resource of an SR, the first logical channel is a logical channel corresponding to a scheduling request configuration of the SR, or a logical channel that triggers the SR; in a case that the first transmission resource is an uplink shared channel resource, the first logical channel is a logical channel for acquiring data transmitted on the uplink shared channel resource.

In order to achieve the foregoing purpose, one embodiment of the present disclosure provides a computer-readable storage medium, including a program stored thereon. The program is executed by a processor to implement steps of the foregoing transmission method.

In order to achieve the foregoing purpose, one embodiment of the present disclosure provides a terminal, including: a determining module configured to, in a case that a first transmission resource overlaps with a second transmission resource, determine a logical channel with higher latency requirement from a first logical channel and a second logical channel; and an instruction module configured to instruct a physical layer to transmit data on a transmission resource corresponding to the determined logical channel. The first logical channel is corresponding to the first transmission resource, and the second logical channel is corresponding to the second transmission resource.

Optionally, the determining module includes: an acquiring sub-module configured to acquire configuration information of logical channels, where the logical channels include the first logical channel and the second logical channel; a determining sub-module configured to, according to the configuration information of the logical channels, determine the logical channel with higher latency requirement from the first logical channel and the second logical channel.

Optionally, the configuration information is used to indicate transmission latency of the logical channels.

Optionally, the configuration information includes at least one of the following: duration information of a maximum physical uplink shared channel (PUSCH), subcarrier spacing (SCS) list information, modulation and coding scheme (MCS) list information, priority information or configuration grant information.

Optionally, in a case that the configuration information includes the duration information of the maximum physical uplink shared channel (PUSCH), the determining sub-module is configured to, in a case that a duration of a first PUSCH is less than or equal to a duration of a second PUSCH, determine the first logical channel as a logical channel with higher latency requirement; otherwise, determine the second logical channel as a logical channel with higher latency requirement. The duration of the first PUSCH is a duration of maximum PUSCH configured on the first logical channel; and the duration of the second PUSCH is a duration of maximum PUSCH configured on the second logical channel.

Optionally, in a case that the configuration information includes subcarrier spacing (SCS) list information, the determining sub-module is configured to, in a case that a first SCS is greater than or equal to a second SCS, determine the first logical channel as a logical channel with higher latency requirement; otherwise, determine the second logical channel as a logical channel with higher latency requirement. The first SCS is a maximum SCS configured on the first logical channel, and the second SCS is a maximum SCS configured on the second logical channel.

Optionally, in a case that the configuration information includes configuration grant information, the determining sub-module is configured to, in a case that first configuration grant information includes allowing to use configured-grant-type 1 and second configuration grant information includes not allowing to use configured-grant-type 1, determine the first logical channel as a logical channel with higher latency requirement; in a case that the first configuration grant information includes not allowing to use configured-grant-type 1 and the second configuration grant information includes allowing to use configured-grant-type 1, determine the second logical channel as a logical channel with higher latency requirement. The first configuration grant information is configuration grant information of the first logical channel, and the second configuration grant information is configuration grant information of the second logical channel.

Optionally, in a case that the configuration information includes priority information, the determining sub-module is configured to, in a case that a first priority is higher than or equal to a second priority, determine the first logical channel as a logical channel with higher latency requirement; otherwise, determine the second logical channel as a logical channel with higher latency requirement. The first priority is a priority configured for the first logical channel, and the second priority is a priority configured for the second logical channel.

Optionally, in a case that the configuration information includes duration information of a maximum physical uplink shared channel (PUSCH), subcarrier spacing (SCS) list information, modulation and coding scheme (MCS) list information and configuration grant information, the determining sub-module includes: a judgement unit configured to judge whether the configuration information meets a preset condition; a determining unit configured to, in a case that the configuration information meets the preset condition, determine the first logical channel as a logical channel with higher latency requirement; otherwise, determine the second logical channel as a logical channel with higher latency requirement. The preset condition includes at least one of the following: a duration of a first PUSCH is less than or equal to a duration of a second PUSCH; a first SCS is greater than or equal to a second SCS; first configuration grant information includes allowing to use configured-grant-type and second configuration grant information includes not allowing to use configured-grant-type; first MCS information includes supporting a preset modulation method, or second MCS information includes not supporting a preset modulation method. The duration of the first PUSCH is a duration of maximum PUSCH configured on the first logical channel; and the duration of the second PUSCH is a duration of maximum PUSCH configured on the second logical channel. The first SCS is a maximum SCS configured on the first logical channel, and the second SCS is a maximum SCS configured on the second logical channel. The first configuration grant information is configuration grant information of the first logical channel, and the second configuration grant information is configuration grant information of the second logical channel. The first MCS information is MCS information supported by the first logical channel, and the second MCS information is MCS information supported by the second logical channel.

The embodiments of the present disclosure have the following beneficial effects:

In the foregoing technical solution of the embodiment of the present disclosure, in a case that the first transmission resource overlaps with the second transmission resource, a logical channel with higher latency requirement is determined from the first logical channel and the second logical channel; and the physical layer is instructed to transmit data on a transmission resource corresponding to the determined logical channel. In the embodiment of the present disclosure, in a case that resources overlap, data is transmitted preferentially on a transmission resource corresponding to a logical channel with higher latency requirement, thereby solving the problem that in a case of resource overlapping, the transmission scheme in the related art will affect the transmission latency of services with higher latency requirement.

DETAILED DESCRIPTION

Figure 1:
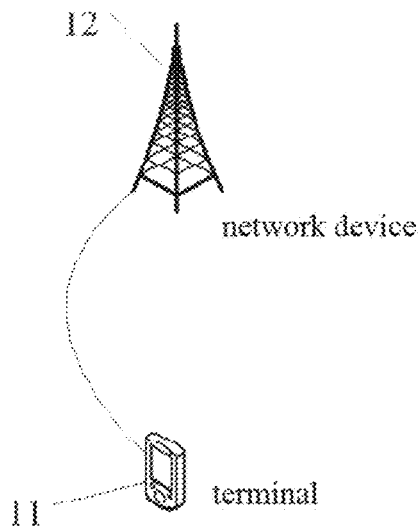
FIG. 1 is a structural diagram of a network system applicable to embodiments of the present disclosure.

Exemplary embodiments of the present disclosure will be described hereinafter in details with reference to the accompanying drawings. Although exemplary embodiments of the present disclosure are shown in the drawings, it should be understood that the present disclosure may be implemented in various forms and should not be limited by the embodiments set forth herein. On the contrary, these embodiments are provided to enable a thorough understanding of the present disclosure, and to fully convey the scope of the present disclosure to those skilled in the art.

The terms "first" and "second" in the specification and claims of this application are used to distinguish similar objects, and not necessarily used to describe a specific sequence or sequence. It should be understood that data used in this way may be interchanged under appropriate circumstances, so that the embodiments of the present application described herein may be implemented, for example, in a sequence other than those illustrated or described herein. In addition, the terms "including" and "having" and any other variants thereof are intended to cover non-exclusive inclusion. For example, a process, method, system, product or device including a series of steps or units not only includes those clearly listed steps or units, but also includes other steps or units that are not explicitly listed or also include steps or units inherent to this process, method, system, product or device. In the specification and claims, "and/or" means at least one of the connected objects.

The following description provides examples, and is not limiting of the scope, applicability, or configuration set forth in the claims. Changes may be made in functions and arrangements of elements discussed without departing from spirit and scope of the present disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, FIG. 1 is a structural diagram of a network system applicable to embodiments of the present disclosure. As shown in FIG. 1, the network system includes a terminal 11 and a network device 12. The terminal 11 may be a user terminal (UE) or other terminal device such as a mobile phone, a tablet personal computer, a laptop computer, a personal digital assistant (PDA), a mobile internet device (MID) or a wearable device. It should be noted that the specific type of the terminal 11 is not limited in the embodiments of the present disclosure. The network device 12 may be a base station, such as a macro station, an LTE eNB and a 5G NR NB. The network device may also be a small station, such as a low power node (LPN), a pico station, a femto station. The network device may also be an access point (AP). The base station may also be a network node composed of a central unit (CU) and multiple transmission reception points (TRP) which are managed and controlled by the central unit. It should be noted that the specific type of the network device is not limited in the embodiments of the present disclosure.

In order to enable those skilled in the art to better understand technical solutions of the embodiments of the present disclosure, Scheduling request (SR) and hybrid automatic repeat request (HARQ) feedback are first described as follows.

1) Scheduling Request.

In a case that a user equipment (UE) has no uplink data to transmit, a network side does not need to allocate an uplink resource for the UE, otherwise it will cause a waste of the resource. Thus, the UE needs to notify the network side whether it has uplink data to transmit, so that the network side can decide whether to allocate an uplink resource to the UE. For this reason, an uplink scheduling request (SR) mechanism is provided in the new radio (NR).

The UE notifies the network side, through the SR, whether uplink resources are needed for transmission of an uplink-shared channel (UL-SCH), but does not notify the network side how much uplink data needs to be transmitted (which is reported by a buffer status report (BSR)). After the network side receives the SR, how many uplink resources are allocated to the UE depends on implementation of the network side, and a usual approach is to allocate at least enough resources for the UE to transmit the BSR. The foregoing UL-SCH has a corresponding relationship with a physical uplink shared channel (PUSCH).

The network side does not know when the UE needs to transmit uplink data, i.e., not know when the UE transmits an SR. Thus, the network side needs to detect whether there is an SR report on an allocated SR resource.

There are two forms of SR transmission including:
a dedicated SR transmission which uses a dedicated physical uplink control channel (PUCCH) resource configured by the network; and
a random access SR transmission which use an uplink resource acquired through an random access procedure.

Considering that different services have different latency requirements, in the 5G system, the network side is allowed to configure multiple sets of dedicated SR resources for the terminal to select one of the SR resources according to different services, and a mapping relationship between each logical channel and a dedicated SR resource may also be configured. Once a regular BSR is triggered at the terminal, the terminal first determines a logical channel that triggers the regular BSR, then selects and determines an available dedicated SR resource according to a mapping relationship between the logical channel and the dedicated SR resource, and then transmits the SR on the resource. In a case that a logical channel that triggers the regular BSR is not configured with a dedicated SR resource, the terminal is triggered to initiate a random access SR. Once the random access SR is triggered, all pending SRs need to be cancelled.

In addition, after any dedicated SR of the terminal reaches a maximum number of transmissions, the random access SR is also triggered. After the dedicated SR fails, the terminal needs to perform a series of processing, including notifying an RRC layer to release PUCCH resources corresponding to all serving cells, notifying the RRC layer to release SRS resources corresponding to all serving cells, and clearing resources for uplink/downlink semi-persistent scheduling.

A media access control (MAC) entity may be configured with 0, 1 or multiple SR configurations. An SR configuration includes a series of PUCCH resources on multiple bandwidth parts (BWPs) and a cell. For a logical channel, each BWP can only be configured with one PUCCH resource at most.

Each SR configuration is corresponding to one or more logical channels, and each logical channel may be corresponding to 0 or 1 SR, which are configured by RRC signaling.

Herein, an SR that is triggered and not transmitted, is considered to be a pending SR, that is, an SR that is in a pending state.

The UE transmits an SR because there is no uplink PUSCH resource, thus the UE can only transmit the SR on the PUCCH. The network side may allocate a dedicated SR resource for each UE for transmitting SR. The SR resource is periodic and appears once every n time slots or symbols.

Figure 2:
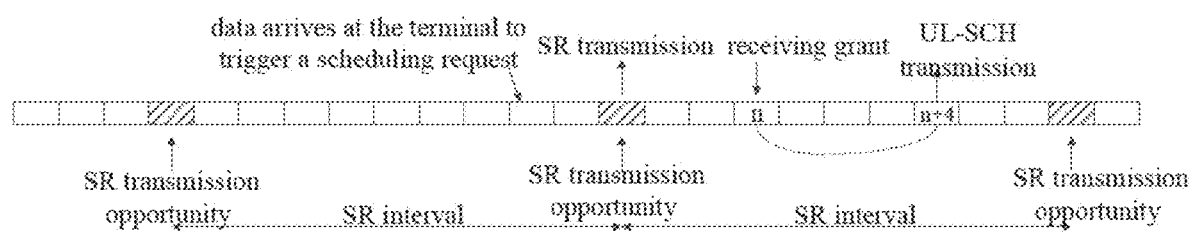
FIG. 2 is a schematic diagram of SR transmission.

As shown in FIG. 2, after data arrives at a UE, an SR is triggered. The UE transmits the SR at a next closest SR transmission opportunity. Then the UE receives an UL grant and transmits the data, which generally refers to a data packet containing a BSR, on PUSCH (UL-SCH) indicated by the UL grant.

2) Harq Feedback.

After a UE receives downlink DL data, the UE needs to perform HARQ feedback in a UL. Latency requirements of HARQ feedback for services with higher latency requirement are also higher than those of ordinary services. For example, a latency requirement of HARQ feedback for an URLLC service is higher than a latency requirement of HARQ feedback for an eMBB service.

Figure 3:
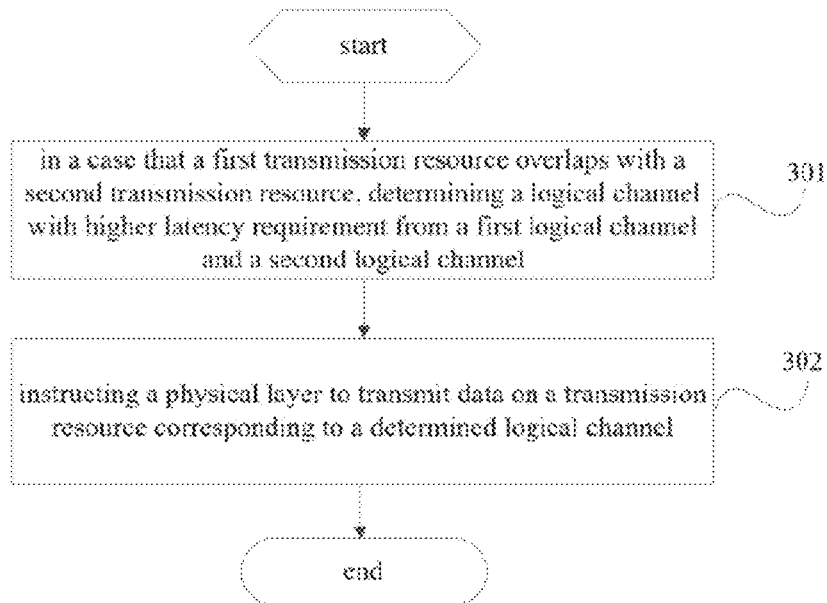
FIG. 3 is a schematic flowchart of a transmission method according to an embodiment of the present disclosure.

As shown in FIG. 3, one embodiment of the present disclosure provides a transmission method performed by a terminal and including the following steps.

Step 301: in a case that a first transmission resource overlaps with a second transmission resource, determining a logical channel with higher latency requirement from a first logical channel and a second logical channel; where the first logical channel is corresponding to the first transmission resource, and the second logical channel is corresponding to the second transmission resource.

Specifically, the foregoing first logical channel is a logical channel corresponding to media access control packet data unit (MAC PDU) transmitted on the first transmission resource; and the second logical channel is a logical channel corresponding to MAC PDU transmitted on the second transmission resource.

Here, the first transmission resource is a transmission resource of control information, and the second transmission resource is an uplink shared channel resource; or, the first transmission resource and the second transmission resource are both uplink shared channel resources. The foregoing resource overlap may specifically refer to overlap of resources in time domain.

The foregoing control information includes at least one kind of the following: scheduling request (SR), hybrid automatic repeat request (HARQ) feedback information, or channel state information (CSI). The CSI here is indicated based on downlink control information (DCI) of the network.

In a case that the first transmission resource is a transmission resource of an SR, the first logical channel is a logical channel corresponding to a scheduling request configuration of the SR, or a logical channel that triggers the SR.

Here, the BSR triggers the SR so that the SR becomes a triggered or pending state, and an SR configuration corresponding to a logical channel that triggers the BSR is an SR configuration corresponding to the triggered or pending SR, that is, the logical channel that triggers the BSR is a logical channel that triggers the SR.

In a case that the first transmission resource is an uplink shared channel resource, the first logical channel is a logical channel for acquiring data transmitted on the uplink shared channel resource.

Further, the foregoing logical channel with higher latency requirement refers to a logical channel with a lower transmission latency.

Step 302: instructing a physical layer to transmit data on a transmission resource corresponding to the determined logical channel.

For example, in a case that the first logical channel is a logical channel with higher latency requirement, data is transmitted on the first transmission resource, that is, data of the first logical channel data is transmitted preferentially; in a case that the second logical channel is a logical channel with higher latency requirement, data is transmitted on the second transmission resource, that is, data of the second logical channel data is transmitted preferentially.

In the transmission method of the embodiment of the present disclosure, in a case that the first transmission resource overlaps with the second transmission resource, a logical channel with higher latency requirement is determined from the first logical channel and the second logical channel; and the physical layer is instructed to transmit data on a transmission resource corresponding to the determined logical channel. In the embodiment of the present disclosure, in a case that resources overlap, data is transmitted preferentially on a transmission resource corresponding to a logical channel with higher latency requirement, thereby solving the problem that in a case of resource overlapping, the transmission scheme in the related art will affect the transmission latency of services with higher latency requirement.

Further, determining a logical channel with higher latency requirement from a first logical channel and a second logical channel, includes:
  acquiring configuration information of logical channels, where the logical channels include the first logical channel and the second logical channel;
  according to the configuration information of the logical channels, determining the logical channel with higher latency requirement from the first logical channel and the second logical channel.

The foregoing configuration information of the logical channels is used to indicate transmission latency of the logical channels.

The foregoing configuration information includes at least one of the following: duration information of a maximum physical uplink shared channel (PUSCH), subcarrier spacing (SCS) list information, modulation and coding scheme (MCS) list information, priority information or configuration grant information.

The shorter the latency required by the logical channel, a shorter duration of PUSCH is set, or a larger SCS length is set, or configured-grant-type 1 is allowed to be used, or a higher priority is configured.

Further, in a case that the configuration information includes the duration information of the maximum physical uplink shared channel (PUSCH), determining a logical channel with higher latency requirement from a first logical channel and a second logical channel, includes:
  in a case that a duration of a first PUSCH is less than or equal to a duration of a second PUSCH, determining the first logical channel as a logical channel with higher latency requirement; otherwise, determining the second logical channel as a logical channel with higher latency requirement;
  where the duration of the first PUSCH is a duration of maximum PUSCH configured on the first logical channel; and the duration of the second PUSCH is a duration of maximum PUSCH configured on the second logical channel.

A specific description will be given below in conjunction with a first embodiment.

In the first embodiment, the foregoing first transmission resource is a transmission resource of control information SR, and the foregoing second transmission resource is an uplink shared channel resource.

Step 1: transmitting, by a network device, configuration information of logical channels to a user equipment, where the configuration information includes duration information of a maximum PUSCH.

For example, for a logical channel 1, its parameter maxPUSCH-Duration, i.e., a duration of a maximum PUSCH, is 0.5 slots, which means that a duration of an uplink-granted PUSCH that the logical channel 1 is able to use, is up to 0.5 slots; for a logical channel 2, its parameter maxPUSCH-Duration, i.e., a duration of a maximum PUSCH, is 0.25 slots, which means that a duration of an uplink-granted PUSCH that the logical channel 2 is able to use, is up to 0.25 slots. It is generally believed that the shorter the maxPUSCH-Duration, the shorter the latency required for the logical channel.

Step 2: receiving, at the user equipment, the configuration information of the logical channels transmitted by the network device.

Figure 4:
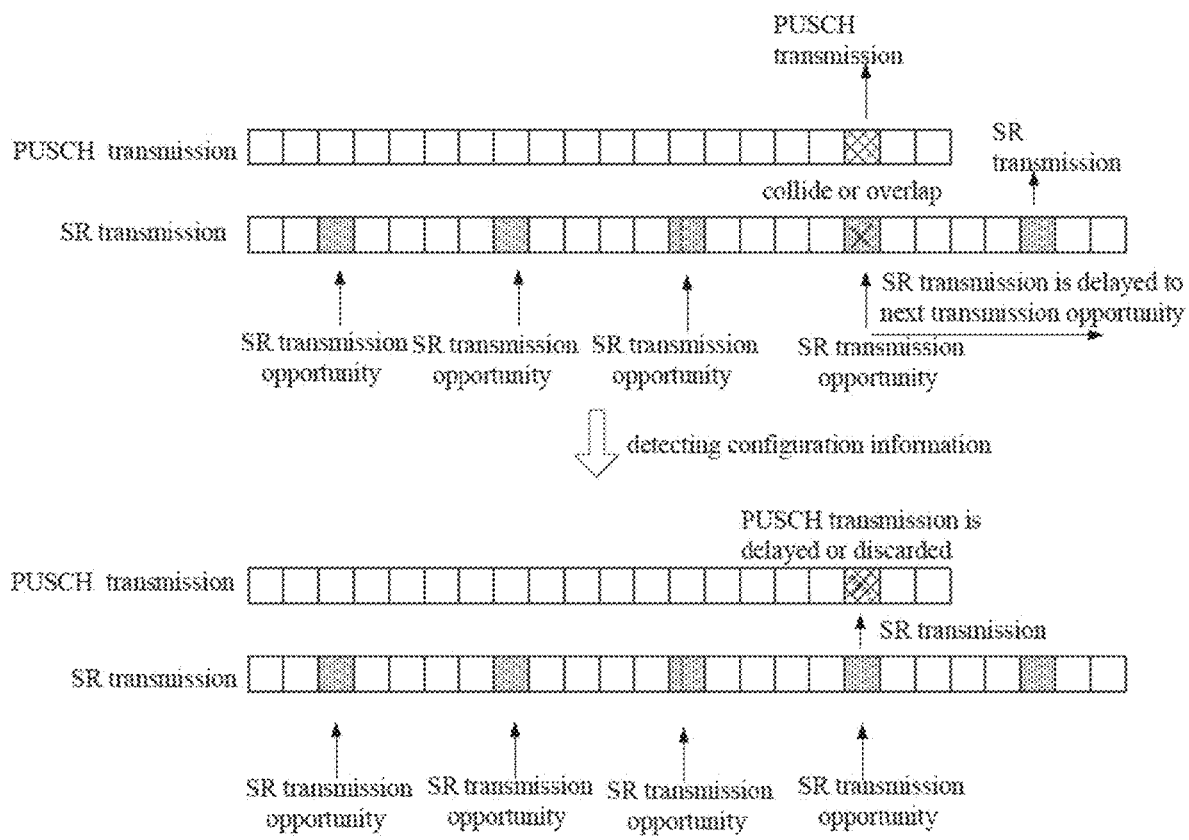
FIG. 4 is a schematic diagram of PUSCH transmission and SR transmission according to an embodiment of the present disclosure.

Step 3: in a case that at least one SR of the user equipment is in a pending state, for each pending SR,
  as shown in FIG. 4, in a case that a PUCCH resource of an SR configuration of a currently pending SR overlaps UL-SCH and a duration of a first PUSCH of a first logical channel corresponding to the SR configuration is less than or equal to a duration of a second PUSCH of a second logical channel corresponding to the UL-SCH, instructing, by an MAC entity, a physical layer to transmit the SR on the PUCCH resource.

For example, a logical channel corresponding to the current SR configuration is a logical channel 1, and a parameter maxPUSCH-Duration configured for the logical channel 1 is 0.25 slots. A parameter maxPUSCH-Duration configured for a logical channel for acquiring transmission data of an UL-SCH that currently overlaps or collides with the SR configuration, is 0.5 slots. Since 0.25 slots are less than 0.5 slots, then it is considered that the SR configuration can be transmitted in priority to the UL-SCH, and the physical layer transmits the SR.

Further, in a case that the configuration information includes subcarrier spacing (SCS) list information, determining a logical channel with higher latency requirement from a first logical channel and a second logical channel, includes:

in a case that a first SCS is greater than or equal to a second SCS, determining the first logical channel as a logical channel with higher latency requirement; otherwise, determining the second logical channel as a logical channel with higher latency requirement;

where the first SCS is a maximum SCS configured on the first logical channel, and the second SCS is a maximum SCS configured on the second logical channel.

A specific description will be given below in conjunction with a second embodiment.

In the second embodiment, the foregoing first transmission resource is a transmission resource of control information SR, and the foregoing second transmission resource is an uplink shared channel resource.

Step 1: transmitting, by a network device, configuration information of logical channels to a user equipment, where the configuration information includes SCS list information.

For example, for a logical channel 1, in its parameter, i.e., an allowable SCS list allowedSCS-List, sub-carrier spacings are 120 KHz and 60 KHz, which means that uplink-granted sub-carrier spacings that the logical channel 1 is able to use, are 120 KHz and 60 KHz. For a logical channel 2, in its parameter, i.e., an allowable SCS list allowedSCS-List, sub-carrier spacing is 240 KHz, which means that uplink-granted sub-carrier spacing that the logical channel 2 is able to use, is 240 KHz. It is generally believed that the larger an SCS value in the allowedSCS-List, the shorter the latency required for the logical channel.

Step 2: receiving, at the user equipment, the configuration information transmitted by the network device.

Step 3: in a case that at least one SR of the user equipment is in a pending state, for each pending SR, as shown in FIG. 4, in a case that a PUCCH resource of an SR configuration of a currently pending SR overlaps UL-SCH and a first subcarrier spacing of a first logical channel corresponding to the SR configuration is greater than or equal to a second subcarrier spacing of a second logical channel corresponding to the UL-SCH, instructing, by an MAC entity, a physical layer to transmit the SR on the PUCCH resource.

For example, a logical channel corresponding to the current SR configuration is a logical channel 1, and a maximum subcarrier spacing in a parameter allowedSCS-List configured for the logical channel 1 is 120 KHz. A maximum subcarrier spacing in a parameter allowedSCS-List configured for a logical channel for acquiring transmission data of an UL-SCH that currently overlaps or collides with the SR configuration, is 60 KHz. Since 120 is greater than 60, then it is considered that the SR configuration can be transmitted in priority to the UL-SCH, and the physical layer transmits the SR.

Further, in a case that the configuration information includes configuration grant information, determining a logical channel with higher latency requirement from a first logical channel and a second logical channel, includes:

in a case that first configuration grant information includes allowing to use configured-grant-type 1 and second configuration grant information includes not allowing to use configured-grant-type 1, determining the first logical channel as a logical channel with higher latency requirement;

in a case that the first configuration grant information includes not allowing to use configured-grant-type 1 and the second configuration grant information includes allowing to use configured-grant-type 1, determining the second logical channel as a logical channel with higher latency requirement;

where the first configuration grant information is configuration grant information of the first logical channel, and the second configuration grant information is configuration grant information of the second logical channel.

A specific description will be given below in conjunction with a third embodiment.

In the third embodiment, the foregoing first transmission resource is a transmission resource of control information SR, and the foregoing second transmission resource is an uplink shared channel resource.

Step 1: transmitting, by a network device, configuration information of logical channels to a user equipment, where the configuration information includes configuration grant information.

For example, for a logical channel 1, its parameter configuredGrantType1Allowed is true, which means that the logical channel 1 is able to use configured-grant-type 1; for a logical channel 2, its parameter configuredGrantType1Allowed is false, which means that the logical channel 2 is unable to use configured-grant-type 1. It is generally believed that using configured-grant-type 1 can reduce data transmission latency.

Step 2: receiving, at the user equipment, the configuration information transmitted by the network device.

Step 3: in a case that at least one SR of the user equipment is in a pending state, for each pending SR, as shown in FIG. 4, in a case that a PUCCH resource of an SR configuration of a currently pending SR overlaps UL-SCH and a first logical channel corresponding to the SR configuration is allowed to use configured-grant-type 1 while a second logical channel corresponding to the UL-SCH is not allowed to use configured-grant-type 1, instructing, by an MAC entity, a physical layer to transmit the SR on the PUCCH resource.

For example, a logical channel corresponding to the current SR configuration is a logical channel 1, and a parameter configuredGrantType1Allowed configured for the logical channel 1 is true; a parameter configuredGrantType1Allowed configured for a logical channel for acquiring transmission data of an UL-SCH that currently overlaps or collides with the SR configuration, is false; then it is considered that the SR configuration can be transmitted in priority to the UL-SCH, and the physical layer transmits the SR.

Further, in a case that the configuration information includes priority information, determining a logical channel with higher latency requirement from a first logical channel and a second logical channel, includes:

in a case that a first priority is higher than or equal to a second priority, determining the first logical channel as a logical channel with higher latency requirement; otherwise, determining the second logical channel as a logical channel with higher latency requirement;

where the first priority is a priority configured for the first logical channel, and the second priority is a priority configured for the second logical channel.

In the embodiment of the present disclosure, the shorter the latency required by the logical channel, the higher the priority configured for the logical channel.

For example, a logical channel corresponding to the current SR configuration is a logical channel 1, and a priority configured for the logical channel 1 is a first priority. A priority configured for a logical channel for acquiring transmission data of an UL-SCH that currently overlaps or collides with the SR configuration, is a second priority. The first priority is higher than the second priority. Then, it is considered that the SR configuration can be transmitted in priority to the UL-SCH, and the physical layer transmits the SR.

Further, in a case that the configuration information includes duration information of a maximum physical uplink shared channel (PUSCH), subcarrier spacing (SCS) list information, modulation and coding scheme (MCS) list information and configuration grant information, determining a logical channel with higher latency requirement from a first logical channel and a second logical channel, includes:
   judging whether the configuration information meets a preset condition;
   in a case that the configuration information meets the preset condition, determining the first logical channel as a logical channel with higher latency requirement; otherwise, determining the second logical channel as a logical channel with higher latency requirement;
   where the preset condition includes at least one of the following:
   a duration of a first PUSCH is less than or equal to a duration of a second PUSCH;
   a first SCS is greater than or equal to a second SCS;
   first configuration grant information includes allowing to use configured-grant-type and second configuration grant information includes not allowing to use configured-grant-type; or,
   first MCS information includes supporting a preset modulation method, and second MCS information includes not supporting a preset modulation method;
   where the duration of the first PUSCH is a duration of maximum PUSCH configured on the first logical channel; and the duration of the second PUSCH is a duration of maximum PUSCH configured on the second logical channel;
   where the first SCS is a maximum SCS configured on the first logical channel, and the second SCS is a maximum SCS configured on the second logical channel;
   where the first configuration grant information is configuration grant information of the first logical channel, and the second configuration grant information is configuration grant information of the second logical channel;
   where the first MCS information is MCS information supported by the first logical channel, and the second MCS information is MCS information supported by the second logical channel.

A specific description will be given below in conjunction with a fourth embodiment.

In the fourth embodiment, the foregoing first transmission resource and the foregoing second transmission resource are both uplink shared channel resources.

Step 1: transmitting, by a network device, configuration information of logical channels to a user equipment (UE), where the configuration information includes at least one of the following: duration information of a maximum physical uplink shared channel (PUSCH) that a logical channel is able to use, subcarrier spacing (SCS) list information, MCS list information or whether to allow use configuration grant information.

For example, for a logical channel 1, its parameter maxPUSCH-Duration, i.e., a duration of a maximum PUSCH, is 0.5 slots, which means that a duration of an uplink-granted PUSCH that the logical channel 1 is able to use, is up to 0.5 slots; for a logical channel 2, its parameter maxPUSCH-Duration, i.e., a duration of a maximum PUSCH, is 0.25 slots, which means that a duration of an uplink-granted PUSCH that the logical channel 2 is able to use, is up to 0.25 slots. It is generally believed that the shorter the max-PUSCH-Duration, the shorter the latency required for the logical channel.

For example, for a logical channel 1, in its parameter, i.e., an allowable SCS list allowedSCS-List, sub-carrier spacings are 120 KHz and 60 KHz, which means that uplink-granted sub-carrier spacings that the logical channel 1 is able to use, are 120 KHz and 60 KHz. For a logical channel 2, in its parameter, i.e., an allowable SCS list allowedSCS-List, sub-carrier spacing is 240 KHz, which means that uplink-granted sub-carrier spacing that the logical channel 2 is able to use, is 240 KHz. It is generally believed that the larger an SCS value in the allowedSCS-List, the shorter the latency required for the logical channel.

For example, for a logical channel 1, its parameter configuredGrantType1Allowed is true, which means that the logical channel 1 is able to use configured-grant-type 1; for a logical channel 2, its parameter configuredGrantType1Allowed is false, which means that the logical channel 2 is unable to use configured-grant-type 1. It is generally believed that using configured-grant-type 1 can reduce data transmission latency.

Step 2: receiving, at the user equipment, the configuration information transmitted by the network device.

Figure 5:
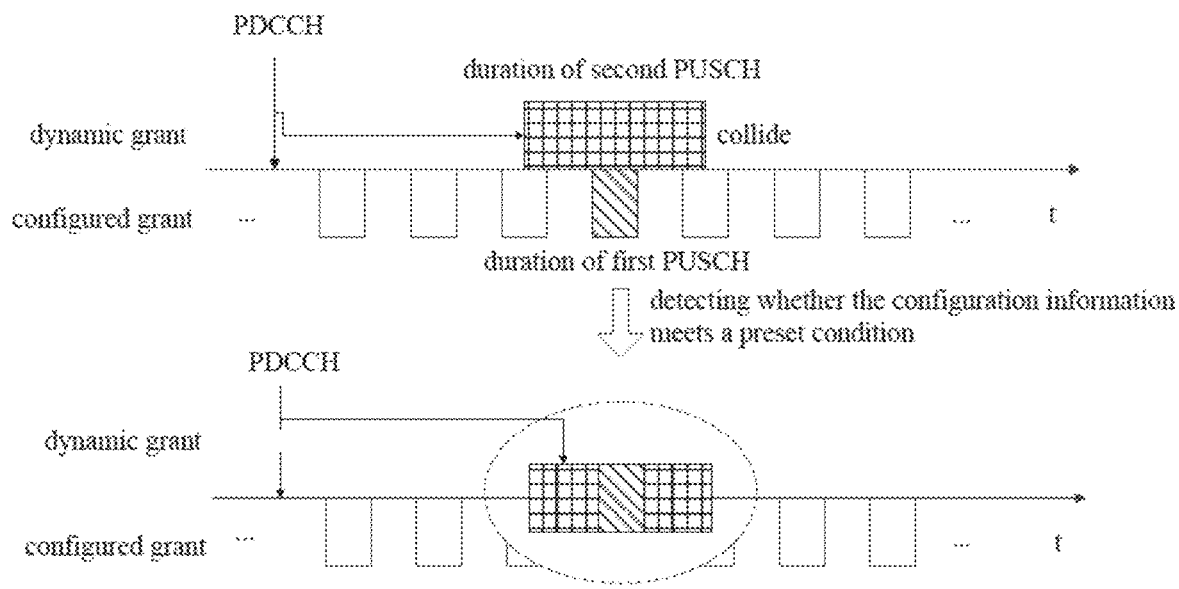
FIG. 5 is a schematic diagram of transmission of a first PUSCH and a second PUSCH to an embodiment of the present disclosure.

Step 3: in a case that the user equipment performs data transmission,
   referring to FIG. 5, in a case that UL-SCH channel resources for data transmission collide and a duration of configured-grant PUSCH (i.e., a duration of a first PUSCH) overlaps with a duration of PUSCH (i.e., a duration of a second PUSCH) scheduled by PDCCH, judging, by the UE,
   whether a duration of a maximum PUSCH configured on the first logical channel corresponding to the first PUSCH is less than or equal to a duration of a maximum PUSCH configured on the second logical channel corresponding to the second PUSCH; and/or,
   whether a length of a first SCS configured on the first logical channel corresponding to the first PUSCH is greater than or equal to a length of a second SCS configured on the second logical channel corresponding to the second PUSCH; and/or,
   whether the first logical channel corresponding to the first PUSCH supports configured-grant-type 1; and/or,
   whether the first logical channel corresponding to the first PUSCH supports 64QAM scheduling.
   if yes, the UE transmits data within the duration of the first PUSCH;
   otherwise, the UE transmits data within the duration of the second PUSCH.

In the transmission method of the embodiment of the present disclosure, in a case that the first transmission resource overlaps with the second transmission resource, a logical channel with higher latency requirement is determined from the first logical channel and the second logical channel; and the physical layer is instructed to transmit data on a transmission resource corresponding to the determined logical channel. In the embodiment of the present disclosure, in a case that resources overlap, data is transmitted preferentially on a transmission resource corresponding to a logical channel with higher latency requirement, thereby solving the problem that in a case of resource overlapping, the transmission scheme in the related art will affect the transmission latency of services with higher latency requirement.

Figure 6:
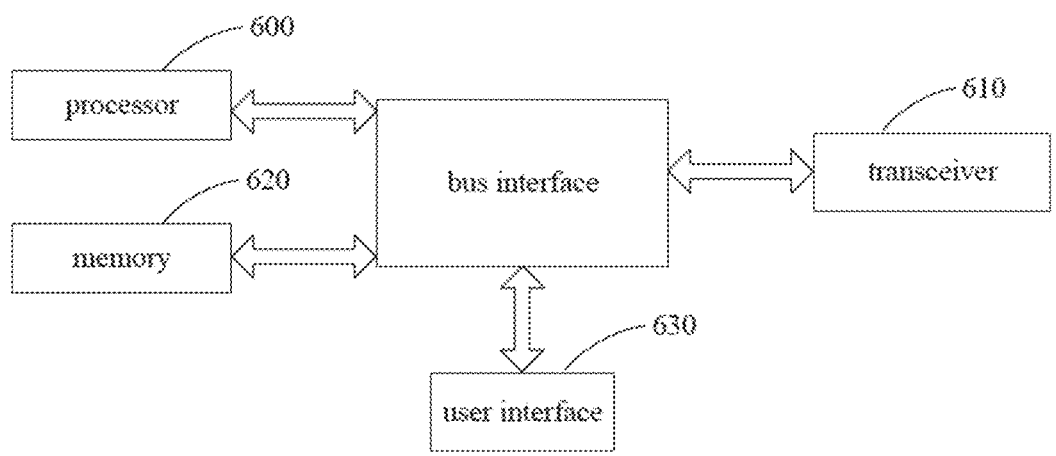
FIG. 6 is a structural block diagram of a terminal to an embodiment of the present disclosure.

As shown in FIG. 6, one embodiment of the present disclosure further provides a terminal, including: a transceiver, a memory, a processor, and a program stored in the memory and executable on the processor. The processor executes the program to implement the following steps:
- in a case that a first transmission resource overlaps with a second transmission resource, determining a logical channel with higher latency requirement from a first logical channel and a second logical channel;
- instructing a physical layer to transmit data on a transmission resource corresponding to the determined logical channel;
- where the first logical channel is corresponding to the first transmission resource, and the second logical channel is corresponding to the second transmission resource.

In FIG. 6, a bus architecture may include any number of interconnected buses and bridges. Specifically, one or more processors demonstrated with a processor 600 are coupled with various circuits of a memory, which is demonstrated with a memory 620. The bus architecture may also link various other circuits, such as, peripherals, voltage regulators, and power management circuits, which is known in the art and thus no further description is provided in the present application. The bus interface provides an interface. The transceiver 610 may be composed of multiple components, that is, including a transmitter and a receiver, which provide a unit for communicating with various other devices via transmitting medium. For different UEs, a user interface 630 may also be an interface capable of externally/internally connecting required devices which may include a keyboard, a monitor, a speaker, microphone, joystick.

The processor 600 is in charge of managing bus architecture and general processing. The memory 620 may store data used when the processor 600 performs operations.

The first transmission resource is a transmission resource of control information, and the second transmission resource is an uplink shared channel resource; or, the first transmission resource and the second transmission resource are both uplink shared channel resources.

The control information includes at least one kind of the following: scheduling request (SR), hybrid automatic repeat request (HARQ) feedback information, or channel state information (CSI).

Optionally, the processor 600 is further configured to read the program in the memory 620 and execute the following steps:
- acquiring configuration information of logical channels, where the logical channels include the first logical channel and the second logical channel;
- according to the configuration information of the logical channels, determining the logical channel with higher latency requirement from the first logical channel and the second logical channel.

Optionally, the configuration information is configured to indicate transmission latency of the logical channels.

Optionally, the configuration information includes at least one of the following: duration information of a maximum physical uplink shared channel (PUSCH), subcarrier spacing (SCS) list information, modulation and coding scheme (MCS) list information, priority information or configuration grant information.

Optionally, in a case that the configuration information includes the duration information of the maximum physical uplink shared channel (PUSCH), the processor 600 is further configured to read the program in the memory 620 and execute the following steps:
- in a case that a duration of a first PUSCH is less than or equal to a duration of a second PUSCH, determining the first logical channel as a logical channel with higher latency requirement; otherwise, determining the second logical channel as a logical channel with higher latency requirement;
- where the duration of the first PUSCH is a duration of a maximum PUSCH configured on the first logical channel; and the duration of the second PUSCH is a duration of a maximum PUSCH configured on the second logical channel.

Optionally, in a case that the configuration information includes subcarrier spacing (SCS) list information, the processor 600 is further configured to read the program in the memory 620 and execute the following steps:
- in a case that a first SCS is greater than or equal to a second SCS, determining the first logical channel as a logical channel with higher latency requirement; otherwise, determining the second logical channel as a logical channel with higher latency requirement;
- where the first SCS is a maximum SCS configured on the first logical channel, and the second SCS is a maximum SCS configured on the second logical channel.

Optionally, in a case that the configuration information includes configuration grant information, the processor 600 is further configured to read the program in the memory 620 and execute the following steps:
- in a case that first configuration grant information includes allowing to use configured-grant-type 1 and second configuration grant information includes not allowing to use configured-grant-type 1, determining the first logical channel as a logical channel with higher latency requirement;
- in a case that the first configuration grant information includes not allowing to use configured-grant-type 1 and the second configuration grant information includes allowing to use configured-grant-type 1, determining the second logical channel as a logical channel with higher latency requirement;
- where the first configuration grant information is configuration grant information of the first logical channel, and the second configuration grant information is configuration grant information of the second logical channel.

Optionally, in a case that the configuration information includes priority information, the processor 600 is further configured to read the program in the memory 620 and execute the following steps:
- in a case that a first priority is higher than or equal to a second priority, determining the first logical channel as a logical channel with higher latency requirement; otherwise, determining the second logical channel as a logical channel with higher latency requirement;
- where the first priority is a priority configured for the first logical channel, and the second priority is a priority configured for the second logical channel.

Optionally, in a case that the configuration information includes duration information of a maximum physical uplink shared channel (PUSCH), subcarrier spacing (SCS) list information, modulation and coding scheme (MCS) list information and configuration grant information, the processor 600 is further configured to read the program in the memory 620 and execute the following steps:
- judging whether the configuration information meets a preset condition;
- in a case that the configuration information meets the preset condition, determining the first logical channel as a logical channel with higher latency requirement;

otherwise, determining the second logical channel as a logical channel with higher latency requirement;
where the preset condition includes at least one of the following:
a duration of a first PUSCH is less than or equal to a duration of a second PUSCH;
a first SCS is greater than or equal to a second SCS;
first configuration grant information includes allowing to use configured-grant-type and second configuration grant information includes not allowing to use configured-grant-type; or,
first MCS information includes supporting a preset modulation method, and second MCS information includes not supporting a preset modulation method;
where the duration of the first PUSCH is a duration of maximum PUSCH configured on the first logical channel; and the duration of the second PUSCH is a duration of maximum PUSCH configured on the second logical channel;
where the first SCS is a maximum SCS configured on the first logical channel, and the second SCS is a maximum SCS configured on the second logical channel;
where the first configuration grant information is configuration grant information of the first logical channel, and the second configuration grant information is configuration grant information of the second logical channel;
where the first MCS information is MCS information supported by the first logical channel, and the second MCS information is MCS information supported by the second logical channel.

In a case that the first transmission resource is a transmission resource of an SR, the first logical channel is a logical channel corresponding to a scheduling request configuration of the SR, or a logical channel that triggers the SR.

Here, the BSR triggers the SR so that the SR becomes a triggered or pending state, and an SR configuration corresponding to a logical channel that triggers the BSR is an SR configuration corresponding to the triggered or pending SR, that is, the logical channel that triggers the BSR is a logical channel that triggers the SR.

In a case that the first transmission resource is an uplink shared channel resource, the first logical channel is a logical channel for acquiring data transmitted on the uplink shared channel resource.

In the terminal of the embodiment of the present disclosure, in a case that the first transmission resource overlaps with the second transmission resource, a logical channel with higher latency requirement is determined from the first logical channel and the second logical channel; and the physical layer is instructed to transmit data on a transmission resource corresponding to the determined logical channel. In the embodiment of the present disclosure, in a case that resources overlap, data is transmitted preferentially on a transmission resource corresponding to a logical channel with higher latency requirement, thereby solving the problem that in a case of resource overlapping, the transmission scheme in the related art will affect the transmission latency of services with higher latency requirement.

In some embodiments of the present disclosure, a computer-readable storage medium is further provided and include a computer program stored thereon. The program is executed by a processor to implement the following steps:
in a case that a first transmission resource overlaps with a second transmission resource, determining a logical channel with higher latency requirement from a first logical channel and a second logical channel;
instructing a physical layer to transmit data on a transmission resource corresponding to the determined logical channel;
where the first logical channel is corresponding to the first transmission resource, and the second logical channel is corresponding to the second transmission resource.

In a case that the program is executed by the processor, all the implementation manners in the foregoing method embodiment applied to the terminal side can be realized, which are not repeated herein to avoid repetition.

Figure 7:
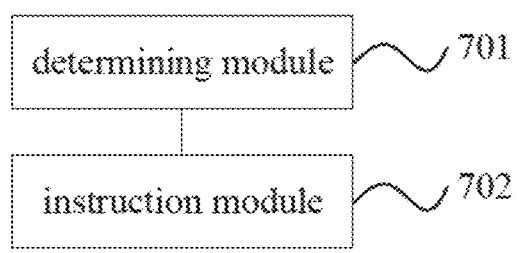
FIG. 7 is a schematic diagram of modules of a terminal to an embodiment of the present disclosure.

As shown in FIG. 7, one embodiment of the present disclosure further provides a terminal, including:
a determining module 701 configured to, in a case that a first transmission resource overlaps with a second transmission resource, determine a logical channel with higher latency requirement from a first logical channel and a second logical channel;
an instruction module 702 configured to instruct a physical layer to transmit data on a transmission resource corresponding to the determined logical channel;
where the first logical channel is corresponding to the first transmission resource, and the second logical channel is corresponding to the second transmission resource.

In the terminal of the embodiment of the present disclosure, the first transmission resource is a transmission resource of control information, and the second transmission resource is an uplink shared channel resource; or, the first transmission resource and the second transmission resource are both uplink shared channel resources.

In the terminal of the embodiment of the present disclosure, the control information includes at least one kind of the following: scheduling request (SR), hybrid automatic repeat request (HARQ) feedback information, or channel state information (CSI).

In the terminal of the embodiment of the present disclosure, the determining module includes:
an acquiring sub-module configured to acquire configuration information of logical channels, where the logical channels include the first logical channel and the second logical channel;
a determining sub-module configured to, according to the configuration information of the logical channels, determine the logical channel with higher latency requirement from the first logical channel and the second logical channel.

In the terminal of the embodiment of the present disclosure, the configuration information is used to indicate transmission latency of the logical channels.

In the terminal of the embodiment of the present disclosure, the configuration information includes at least one of the following: duration information of a maximum physical uplink shared channel (PUSCH), subcarrier spacing (SCS) list information, modulation and coding scheme (MCS) list information, priority information or configuration grant information.

In the terminal of the embodiment of the present disclosure, in a case that the configuration information includes the duration information of the maximum physical uplink shared channel (PUSCH), the determining sub-module is configured to, in a case that a duration of a first PUSCH is less than or equal to a duration of a second PUSCH, determine the first logical channel as a logical channel with higher latency requirement; otherwise, determine the second logical channel as a logical channel with higher latency requirement,
where the duration of the first PUSCH is a duration of maximum PUSCH configured on the first logical channel; and the duration of the second PUSCH is a duration of maximum PUSCH configured on the second logical channel.

In the terminal of the embodiment of the present disclosure, in a case that the configuration information includes subcarrier spacing (SCS) list information, the determining sub-module is configured to, in a case that a first SCS is greater than or equal to a second SCS, determine the first logical channel as a logical channel with higher latency requirement; otherwise, determine the second logical channel as a logical channel with higher latency requirement:
  where the first SCS is a maximum SCS configured on the first logical channel, and the second SCS is a maximum SCS configured on the second logical channel.

In the terminal of the embodiment of the present disclosure, in a case that the configuration information includes configuration grant information, the determining sub-module is configured to,
  in a case that first configuration grant information includes allowing to use configured-grant-type 1 and second configuration grant information includes not allowing to use configured-grant-type 1, determine the first logical channel as a logical channel with higher latency requirement;
  in a case that the first configuration grant information includes not allowing to use configured-grant-type 1 and the second configuration grant information includes allowing to use configured-grant-type 1, determine the second logical channel as a logical channel with higher latency requirement;
  where the first configuration grant information is configuration grant information of the first logical channel, and the second configuration grant information is configuration grant information of the second logical channel.

In the terminal of the embodiment of the present disclosure, in a case that the configuration information includes priority information, the determining sub-module is configured to,
  in a case that a first priority is higher than or equal to a second priority, determine the first logical channel as a logical channel with higher latency requirement; otherwise, determine the second logical channel as a logical channel with higher latency requirement;
  where the first priority is a priority configured for the first logical channel, and the second priority is a priority configured for the second logical channel.

In the terminal of the embodiment of the present disclosure, in a case that the configuration information includes duration information of a maximum physical uplink shared channel (PUSCH), subcarrier spacing (SCS) list information, modulation and coding scheme (MCS) list information and configuration grant information, the determining sub-module includes:
  a judgement unit configured to judge whether the configuration information meets a preset condition;
  a determining unit configured to, in a case that the configuration information meets the preset condition, determine the first logical channel as a logical channel with higher latency requirement; otherwise, determine the second logical channel as a logical channel with higher latency requirement;
  where the preset condition includes at least one of the following:
  a duration of a first PUSCH is less than or equal to a duration of a second PUSCH;
  a first SCS is greater than or equal to a second SCS;
  first configuration grant information includes allowing to use configured-grant-type and second configuration grant information includes not allowing to use configured-grant-type; or,
  first MCS information includes supporting a preset modulation method, and second MCS information includes not supporting a preset modulation method;
  where the duration of the first PUSCH is a duration of maximum PUSCH configured on the first logical channel: and the duration of the second PUSCH is a duration of maximum PUSCH configured on the second logical channel;
  where the first SCS is a maximum SCS configured on the first logical channel, and the second SCS is a maximum SCS configured on the second logical channel;
  where the first configuration grant information is configuration grant information of the first logical channel, and the second configuration grant information is configuration grant information of the second logical channel;
  where the first MCS information is MCS information supported by the first logical channel, and the second MCS information is MCS information supported by the second logical channel.

In the terminal of the embodiment of the present disclosure, in a case that the first transmission resource is a transmission resource of an SR, the first logical channel is a logical channel corresponding to a scheduling request configuration of the SR, or a logical channel that triggers the SR.

Here, the BSR triggers the SR so that the SR becomes a triggered or pending state, and an SR configuration corresponding to a logical channel that triggers the BSR is an SR configuration corresponding to the triggered or pending SR, that is, the logical channel that triggers the BSR is a logical channel that triggers the SR.

In a case that the first transmission resource is an uplink shared channel resource, the first logical channel is a logical channel for acquiring data transmitted on the uplink shared channel resource.

In the terminal of the embodiment of the present disclosure, in a case that the first transmission resource overlaps with the second transmission resource, a logical channel with higher latency requirement is determined from the first logical channel and the second logical channel; and the physical layer is instructed to transmit data on a transmission resource corresponding to the determined logical channel. In the embodiment of the present disclosure, in a case that resources overlap, data is transmitted preferentially on a transmission resource corresponding to a logical channel with higher latency requirement, thereby solving the problem that in a case of resource overlapping, the transmission scheme in the related art will affect the transmission latency of services with higher latency requirement.

In the various embodiments of the present disclosure, it should be understood that sequence numbers of the foregoing processes do not mean orders of execution. Execution orders of various processes should be determined by their functions and internal logics, and should not constitute any limitation to the implementation process of the embodiments of the present disclosure.

The above are optional embodiments of the present disclosure. It should be noted that those skilled in the art may make several improvements and modifications without departing from the principles of the present disclosure and these improvements and modifications are covered by the protection scope of the present disclosure.

What is claimed is:

1. A transmission method, performed by a terminal, comprising:

in response to a first transmission resource overlapping with a second transmission resource, determining a logical channel with higher latency requirement from a first logical channel and a second logical channel; and instructing a physical layer to transmit data on a transmission resource corresponding to the determined logical channel;

wherein the first logical channel is corresponding to the first transmission resource, and the second logical channel is corresponding to the second transmission resource;

wherein the determining the logical channel with higher latency requirement from the first logical channel and the second logical channel, includes:

acquiring configuration information of logical channels, wherein the logical channels include the first logical channel and the second logical channel;

according to the configuration information of the logical channels, determining the logical channel with higher latency requirement from the first logical channel and the second logical channel;

wherein in response to the configuration information including priority information, the determining the logical channel with higher latency requirement from the first logical channel and the second logical channel, includes:

in response to a first priority being higher than or equal to a second priority, determining the first logical channel as a logical channel with higher latency requirement; otherwise, determining the second logical channel as a logical channel with higher latency requirement;

wherein the first priority is a priority configured for the first logical channel, and the second priority is a priority configured for the second logical channel.

2. The transmission method according to claim 1, wherein the first transmission resource is a transmission resource of control information, and the second transmission resource is an uplink shared channel resource; or, the first transmission resource and the second transmission resource are both uplink shared channel resources.

3. The transmission method according to claim 2, wherein the control information includes at least one kind of: a scheduling request (SR), hybrid automatic repeat request (HARQ) feedback information, or channel state information (CSI).

4. The transmission method according to claim 1, wherein the configuration information is configured to indicate transmission latency of the logical channels.

5. The transmission method according to claim 1, wherein the configuration information includes at least one of: duration information of a maximum physical uplink shared channel (PUSCH), subcarrier spacing (SCS) list information, modulation or coding scheme (MCS) list information, priority information and configuration grant information.

6. The transmission method according to claim 1, wherein in response to the configuration information including the duration information of the maximum physical uplink shared channel (PUSCH), the determining the logical channel with higher latency requirement from the first logical channel and the second logical channel, includes:

in response to a duration of a first PUSCH being less than or equal to a duration of a second PUSCH, determining the first logical channel as a logical channel with higher latency requirement; otherwise, determining the second logical channel as a logical channel with higher latency requirement;

wherein the duration of the first PUSCH is a duration of a maximum PUSCH configured on the first logical channel; and the duration of the second PUSCH is a duration of a maximum PUSCH configured on the second logical channel.

7. The transmission method according to claim 1, wherein in response to the configuration information including subcarrier spacing (SCS) list information, the determining the logical channel with higher latency requirement from the first logical channel and the second logical channel, includes:

in response to a first SCS being greater than or equal to a second SCS, determining the first logical channel as a logical channel with higher latency requirement; otherwise, determining the second logical channel as a logical channel with higher latency requirement;

wherein the first SCS is a maximum SCS configured on the first logical channel, and the second SCS is a maximum SCS configured on the second logical channel.

8. The transmission method according to claim 1, wherein in response to the configuration information including configuration grant information, the determining the logical channel with higher latency requirement from the first logical channel and the second logical channel, includes:

in response to first configuration grant information including allowing to use configured-grant-type 1 and second configuration grant information includes not allowing to use configured-grant-type 1, determining the first logical channel as a logical channel with higher latency requirement;

in response to the first configuration grant information including not allowing to use configured-grant-type 1 and the second configuration grant information includes allowing to use configured-grant-type 1, determining the second logical channel as a logical channel with higher latency requirement;

wherein the first configuration grant information is configuration grant information of the first logical channel, and the second configuration grant information is configuration grant information of the second logical channel.

9. The transmission method according to claim 1, wherein in response to the configuration information including duration information of a maximum physical uplink shared channel (PUSCH), subcarrier spacing (SCS) list information, modulation and coding scheme (MCS) list information and configuration grant information, the determining the logical channel with higher latency requirement from the first logical channel and the second logical channel, includes:

judging whether the configuration information meets a preset condition;

in response to the configuration information meeting the preset condition, determining the first logical channel as a logical channel with higher latency requirement; otherwise, determining the second logical channel as a logical channel with higher latency requirement;

wherein the preset condition includes at least one of:

a duration of a first PUSCH is less than or equal to a duration of a second PUSCH;

a first SCS is greater than or equal to a second SCS;

first configuration grant information includes allowing to use configured-grant-type 1 and second configuration grant information includes not allowing to use configured-grant-type 1; or, first MCS information includes supporting a preset modulation method, and second MCS information includes not supporting a preset modulation method;

wherein the duration of the first PUSCH is a duration of a maximum PUSCH configured on the first logical channel; and the duration of the second PUSCH is a duration of a maximum PUSCH configured on the second logical channel;

wherein the first SCS is a maximum SCS configured on the first logical channel, and the second SCS is a maximum SCS configured on the second logical channel;

wherein the first configuration grant information is configuration grant information of the first logical channel, and the second configuration grant information is configuration grant information of the second logical channel;

wherein the first MCS information is MCS information supported by the first logical channel, and the second MCS information is MCS information supported by the second logical channel.

10. The transmission method according to claim 2, wherein in response to the first transmission resource being a transmission resource of an SR, the first logical channel is a logical channel corresponding to a scheduling request configuration of the SR, or a logical channel that triggers the SR;

in response to the first transmission resource is-being an uplink shared channel resource, the first logical channel is a logical channel for acquiring data transmitted on the uplink shared channel resource.

11. A terminal, comprising: a transceiver, a memory, a processor, and a program stored in the memory and executable on the processor; wherein the processor executes the program to implement the following steps:

in response to a first transmission resource overlapping with a second transmission resource, determining a logical channel with higher latency requirement from a first logical channel and a second logical channel; and instructing a physical layer to transmit data on a transmission resource corresponding to the determined logical channel;

wherein the first logical channel is corresponding to the first transmission resource, and the second logical channel is corresponding to the second transmission resource;

wherein the processor executes the program to implement the following steps:

acquiring configuration information of logical channels, wherein the logical channels include the first logical channel and the second logical channel;

according to the configuration information of the logical channels, determining the logical channel with higher latency requirement from the first logical channel and the second logical channel;

wherein in response to the configuration information including priority information, the processor executes the program to implement the following steps:

in response to a first priority being higher than or equal to a second priority determining the first logical channel as a logical channel with higher latency requirement; otherwise, determining the second logical channel as a logical channel with higher latency requirement;

wherein the first priority is a priority configured for the first logical channel, and the second priority is a priority configured for the second logical channel.

12. The terminal according to claim 11, wherein the first transmission resource is a transmission resource of control information, and the second transmission resource is an uplink shared channel resource; or, the first transmission resource and the second transmission resource are both uplink shared channel resources;

wherein the control information includes at least one kind of: a scheduling request (SR), hybrid automatic repeat request (HARQ) feedback information, or channel state information (CSI);

wherein if the first transmission resource is a transmission resource of an SR, the first logical channel is a logical channel corresponding to a scheduling request configuration of the SR, or a logical channel that triggers the SR;

if the first transmission resource is an uplink shared channel resource, the first logical channel is a logical channel for acquiring data transmitted on the uplink shared channel resource.

13. The terminal according to claim 11, wherein the configuration information is configured to indicate transmission latency of the logical channels.

14. The terminal according to claim 11, wherein the configuration information includes at least one of: duration information of a maximum physical uplink shared channel (PUSCH), subcarrier spacing (SCS) list information, modulation and coding scheme (MCS) list information, priority information or configuration grant information.

15. The terminal according to claim 11, wherein in response to the configuration information includes-including the duration information of the maximum physical uplink shared channel (PUSCH), the processor executes the program to implement the following steps:

in response to a duration of a first PUSCH is being less than or equal to a duration of a second PUSCH, determining the first logical channel as a logical channel with higher latency requirement; otherwise, determining the second logical channel as a logical channel with higher latency requirement;

wherein the duration of the first PUSCH is a duration of a maximum PUSCH configured on the first logical channel; and the duration of the second PUSCH is a duration of a maximum PUSCH configured on the second logical channel.

16. The terminal according to claim 11, wherein in response to the configuration information including subcarrier spacing (SCS) list information, the processor executes the program to implement the following steps:

in response to a first SCS being greater than or equal to a second SCS, determining the first logical channel as a logical channel with higher latency requirement; otherwise, determining the second logical channel as a logical channel with higher latency requirement;

wherein the first SCS is a maximum SCS configured on the first logical channel, and the second SCS is a maximum SCS configured on the second logical channel.

17. The terminal according to claim 11, wherein in response to the configuration information including configuration grant information, the processor executes the program to implement the following steps:

in response to first configuration grant information including allowing to use configured-grant-type 1 and second configuration grant information includes not allowing to use configured-grant-type 1, determining the first logical channel as a logical channel with higher latency requirement;

in response to the first configuration grant information including not allowing to use configured-grant-type 1 and the second configuration grant information includes allowing to use configured-grant-type 1, determining the second logical channel as a logical channel with higher latency requirement;

wherein the first configuration grant information is configuration grant information of the first logical channel, and the second configuration grant information is configuration grant information of the second logical channel.

18. The terminal according to claim 11, wherein in response to the configuration information including duration information of a maximum physical uplink shared channel (PUSCH), subcarrier spacing (SCS) list information, modulation and coding scheme (MCS) list information and configuration grant information, the processor executes the program to implement the following steps:

judging whether the configuration information meets a preset condition;

in response to the configuration information-meeting the preset condition, determining the first logical channel as a logical channel with higher latency requirement; otherwise, determining the second logical channel as a logical channel with higher latency requirement;

wherein the preset condition includes at least one:

a duration of a first PUSCH is less than or equal to a duration of a second PUSCH;

a first SCS is greater than or equal to a second SCS;

first configuration grant information includes allowing to use configured-grant-type 1 and second configuration grant information includes not allowing to use configured-grant-type 1; or, first MCS information includes supporting a preset modulation method, and second MCS information includes not supporting a preset modulation method;

wherein the duration of the first PUSCH is a duration of a maximum PUSCH configured on the first logical channel; and the duration of the second PUSCH is a duration of a maximum PUSCH configured on the second logical channel;

wherein the first SCS is a maximum SCS configured on the first logical channel, and the second SCS is a maximum SCS configured on the second logical channel;

wherein the first configuration grant information is configuration grant information of the first logical channel, and the second configuration grant information is configuration grant information of the second logical channel;

wherein the first MCS information is MCS information supported by the first logical channel, and the second MCS information is MCS information supported by the second logical channel.

* * * * *